United States Patent [19]
Clark et al.

[11] Patent Number: 5,176,086
[45] Date of Patent: Jan. 5, 1993

[54] METHOD FOR OPERATING AN INCINERATOR WITH SIMULTANEOUS CONTROL OF TEMPERATURE AND PRODUCTS OF INCOMPLETE COMBUSTION

[75] Inventors: Steven D. Clark, Grand Island; Min-Da Ho, Somers, both of N.Y.

[73] Assignee: Praxair Technology, Inc., Danbury, Conn.

[21] Appl. No.: 851,518

[22] Filed: Mar. 16, 1992

[51] Int. Cl.⁵ .............................................. F23N 5/18
[52] U.S. Cl. ................................... 110/346; 110/186; 236/15 E; 431/12
[58] Field of Search .............. 110/185, 186, 190, 346; 431/12; 236/15 E

[56] References Cited

U.S. PATENT DOCUMENTS

| | | | |
|---|---|---|---|
| 4,279,208 | 7/1981 | Guillaume et al. | 110/346 |
| 4,303,194 | 12/1981 | Kengle et al. | 236/15 E |
| 4,742,783 | 5/1988 | LaSpisa et al. | 236/15 E X |
| 4,782,766 | 11/1988 | Lee et al. | 110/190 |
| 4,861,262 | 8/1989 | Gitman et al. | 431/5 |
| 4,863,371 | 9/1989 | Ho | 431/9 |
| 4,922,841 | 5/1990 | Kent | 110/346 |
| 4,957,050 | 9/1990 | Ho | 110/346 |
| 4,981,087 | 1/1991 | Martin | 110/186 |
| 5,000,102 | 3/1991 | Ho | 110/346 |
| 5,022,332 | 6/1991 | Ding | 110/346 |

FOREIGN PATENT DOCUMENTS 1148369 6/1983 Canada .

OTHER PUBLICATIONS

Chemical Engineering, Dec. 1989, pp. 17, 19, 79–81.

Primary Examiner—Edward G. Favors
Attorney, Agent, or Firm—Stanley Ktorides

[57] ABSTRACT

A method for operating an incinerator wherein fuel is provided into the incinerator separate from combustible waste and upon an increase in oxygen demand, initially refraining from proportionately increasing the oxygen provided into the incinerator and responding by decreasing the flow of fuel so as to control the generation of PICs without substantially raising the incinerator temperature. The oxygen flow is increased when the fuel flowrate has been reduced to a predetermined minimum should this occur.

5 Claims, 3 Drawing Sheets

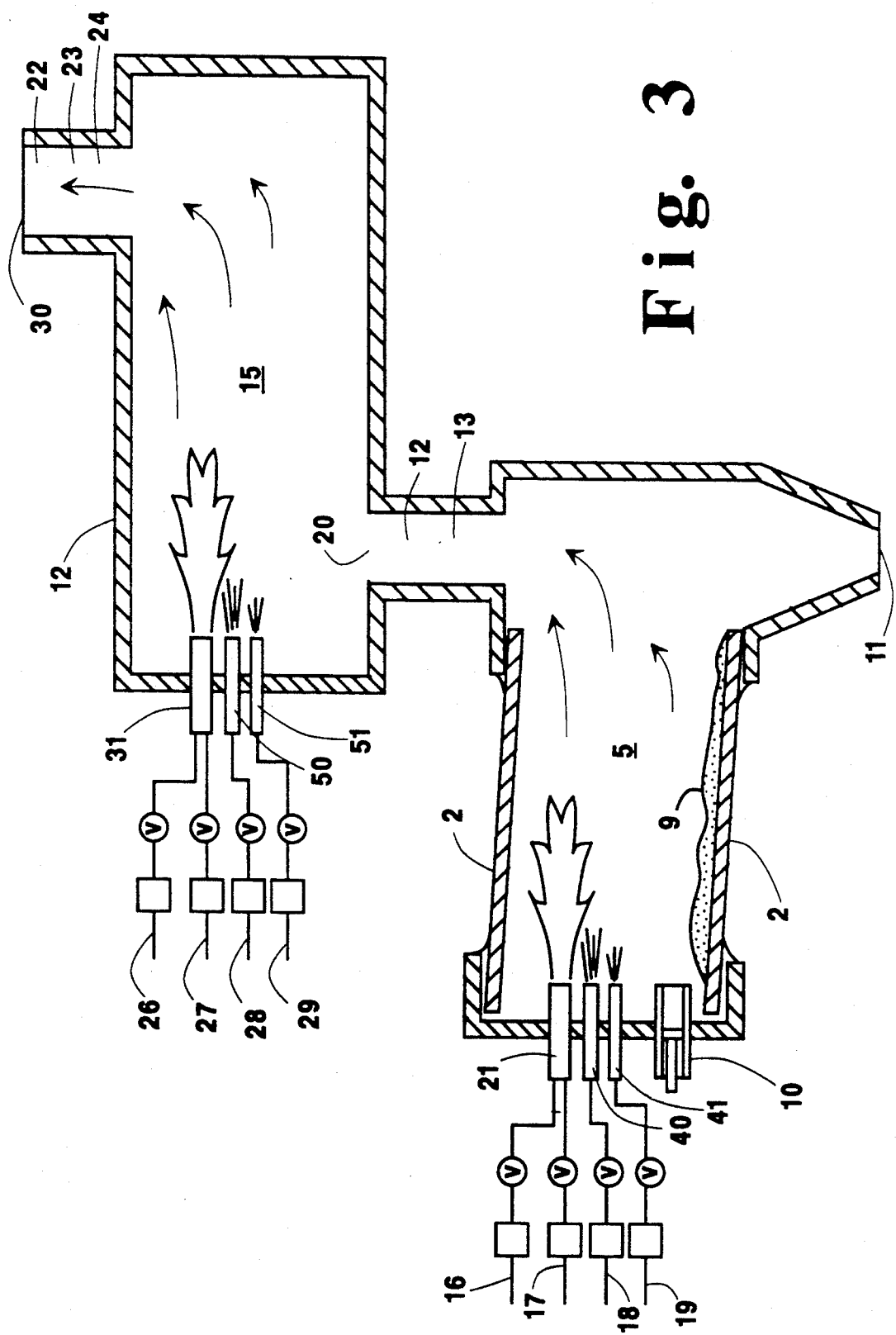

METHOD FOR OPERATING AN INCINERATOR WITH SIMULTANEOUS CONTROL OF TEMPERATURE AND PRODUCTS OF INCOMPLETE COMBUSTION

TECHNICAL FIELD

This invention relates generally to the operation of incinerators wherein fuel is provided to the incinerator for combustion along with the combustion of waste material.

BACKGROUND ART

In the operation of an incinerator, it is desirable to control the generation of products of incomplete combustion (PICs). One way of controlling PICs is to incinerate at a high temperature. However, during system upsets, the temperature may increase to the point where furnace damage results. Several attempts have been made to provide control over both temperature in the furnace and the release of products of incomplete combustion. Generally, past attempts have had to sacrifice the control of one while concentrating on the control of the other during an upset.

Furnaces burning wastes can often have a variable waste feed composition. The amount of BTU value of this waste can vary dramatically. Attempts to homogenize the feed material by blending and mixing have been only partially successful. This variability causes the required process control of the furnace to be very difficult. Furnace temperature must be kept above a permitted level to assure good waste destruction, but must be prevented from being so high that damage to the furnace could occur. Draft must be kept at a negative pressure so that gases and dust cannot escape into the atmosphere. Residence time of the gas is often required to be above a prescribed value to assure complete waste destruction. And sufficient levels of excess oxygen must be available to completely burn the waste material.

A furnace using air as the oxidant controls the furnace temperature by varying the fuel flow rate to the burners and simultaneously varying the air flow rate proportionately to the fuel flow. Excess oxygen is provided by adjusting the ratio of air to fuel, and from air infiltration into the furnace. If a large amount of BTU value is in the waste material, the furnace temperature will start to rise as the heat is released from the waste during incineration. The control system, sensing this rise will start to decrease the amount of fuel being sent to the burner. However, due to the thermal mass of the furnace and the time lag of the temperature control loop, the furnace temperature will overshoot significantly before any correction is made. The air flow rate will also be reduced accordingly, since it is on a proportional basis with fuel flow. This combination of events cause the excess air to be depleted rapidly, and PICs can be released. The temperature is actually prevented from reaching higher levels since there is not enough available oxygen to react with all the available fuel. An operator alerted to these events can manually increase the amount of air being fed to the furnace. However, he is restricted in the amount of air he can add, since adding air will reduce residence time and/or drive the furnace into a positive pressure condition, because for every part of oxygen added from the air, four more parts of nitrogen are also added. These constraints normally prevent the automation of this type of response.

Some incineration systems set the combustion air flow manually at the maximum level in order to buffer the fluctuations in heat release and oxygen demand, while adjusting the fuel flow in response to furnace temperature. Slow response and limited controllability of furnace conditions are the drawbacks to this approach.

Some incineration systems are controlled such that liquid waste flow is cut off when the oxygen level drops below a certain point. However, such a measure is drastic and as a result it tends to upset the smooth operation of the incinerator.

A furnace that utilizes oxygen enrichment can prevent some of the above limitations. Temperature control is the same as in the case of air combustion. However, the excess oxygen level can be controlled directly by varying the oxygen flow. The negative effects of varying the air flow caused by the large amounts of nitrogen in the air are reduced significantly by using pure oxygen. This method of control has been shown to be very effective in controlling excess oxygen levels, and thereby controlling releases of PICs. However, under certain furnace upset conditions, the oxygen injection control method experiences problems. When a depletion of the available oxygen in the furnace occurs due to a rapid release of fuel such as volatile organics from the waste material, the oxygen percent control system responds quickly and increases oxygen flow. This causes these organic materials to be burned in addition to the fuel already being added for temperature control. The dynamics of the furnace and the high thermal inertia of the system cause the temperature control loop to be tuned for slow response. Thus, for a period of time too much heat is being added to the furnace and temperature rises until the temperature control loop can correct the excursion. In addition, the combined oxygen demand due to the burning of waste material and fluid fuel may exceed the capacity of the oxygen supply system, leading to emission of PICs. Also, the combustion products generated may exceed the flue gas handling capacity. Therefore, it is desirable to find a solution to be able to react quickly to high heat release from the waste material, rather than waiting for the temperature loop to respond.

Accordingly, it is an object of this invention to provide a method for operating an incinerator wherein the requisite oxygen demand in the incinerator is satisfied, thus controlling PICs generation, while maintaining appropriate incinerator temperature control so as to avoid equipment damage and while maintaining flue gas volume within design limitations.

SUMMARY OF THE INVENTION

The above and other objects of this invention which will become apparent to one skilled in the art upon a reading of this disclosure are attained by the present invention one aspect of which is:

A method for operating an incinerator for the simultaneous control of temperature and products of incomplete combustion comprising:

(A) providing a main flow of fuel into the incinerator at a flowrate greater than a minimum main fuel flowrate;

(B) providing combustible waste into the incinerator;

(C) providing oxygen into the incinerator at a flowrate sufficient to maintain a desired concentration of oxygen in the exhaust from the incinerator, and carrying out combustion within the incinerator;

(D) monitoring the exhaust from the incinerator and. upon an increase in the oxygen demand in the incinerator, reducing the flowrate of main fuel into the incinerator to maintain the oxygen concentration in the exhaust at the desired concentration and maintain the total heat release rate from the combustion steady. or until the main fuel flowrate has been reduced to the minimum main fuel flowrate: and (E) upon reduction of the main fuel flowrate to the minimum main fuel flowrate. increasing the oxygen flowrate into the incinerator to return the oxygen concentration in the exhaust to the desired concentration.

Another aspect of this invention is:

A method for operating an incinerator for the simultaneous control of temperature and products of incomplete combustion comprising:

(A) providing a main flow of fuel into the incinerator at a flowrate greater than a minimum main fuel flowrate;

(B) providing combustible waste into the incinerator;

(C) providing oxygen into the incinerator at a flowrate sufficient to maintain a desired concentration of combustibles in the exhaust from the incinerator, and carrying out combustion within the incinerator:

(D) monitoring the exhaust from the incinerator and. upon an increase in the combustibles concentration in the exhaust above the desired concentration, reducing the flowrate of main fuel into the incinerator to return the combustibles concentration in the exhaust to the desired concentration and maintain the total heat release rate from the combustion steady. or until the main fuel flowrate has been reduced to the minimum main fuel flowrate: and (E) upon reduction of the main fuel flowrate to the minimum main fuel flowrate. increasing the oxygen flowrate into the incinerator to return the combustibles concentration in the exhaust to the desired concentration.

As used herein. the term "incinerator" means any combustion chamber or zone wherein waste is combusted.

As used herein. the terms "products of incomplete combustion" and "PICs" mean a species which can undergo oxidation or further oxidation under combustion zone conditions of temperature and pressure.

As used herein. the term "burner" means a device through which both fuel and oxidant are provided into a combustion zone.

As used herein. the term "lance" means a device through which only one of fuel and oxidant is provided into a combustion zone.

As used herein, the term "oxygen demand" means the consumption rate of oxygen which is the difference between the input rate and the output rate of oxygen.

"As used herein, the term "monitoring" the exhaust gas can mean either directly measuring or indirectly determining (estimating) the oxygen or combustible concentration of the exhaust gas. Direct measurement can be done using an in-situ probe or a sampling and analyzing device. Indirect determination can be done, for example, by monitoring the exhaust gas further downstream from the desired location, and correcting for the difference by some calculation based on known process parameters or using experience factors. This indirect determination is used when it is difficult to directly monitor the gas stream reliably due to a severe environment such as high dust loading and/or high temperature.

BRIEF DESCRIPTION OF THE DRAWINGS

FIG. 3 is a simplified cross sectional representation of a dual stage incinerator with which the invention may be practiced.

DETAILED DESCRIPTION

This invention comprises, in general, the substantial withholding of increased oxygen provision to a furnace or incineration zone upon an increase in oxygen demand and initially responding to the increased oxygen demand by decreasing the main fuel supplied to the incinerator. By means of this procedure both the temperature and the generation of PICs may be controlled. Preferably, upon an increase in oxygen demand, there is no increased oxygen provided to the furnace or incineration zone and the initial response to the increased oxygen demand comprises only a decrease in the main fuel flow. The invention will have particular utility in the incineration of waste having a highly variable heating value per unit volume and/or which is provided into the incinerator at a highly variable rate.

Figure 1:
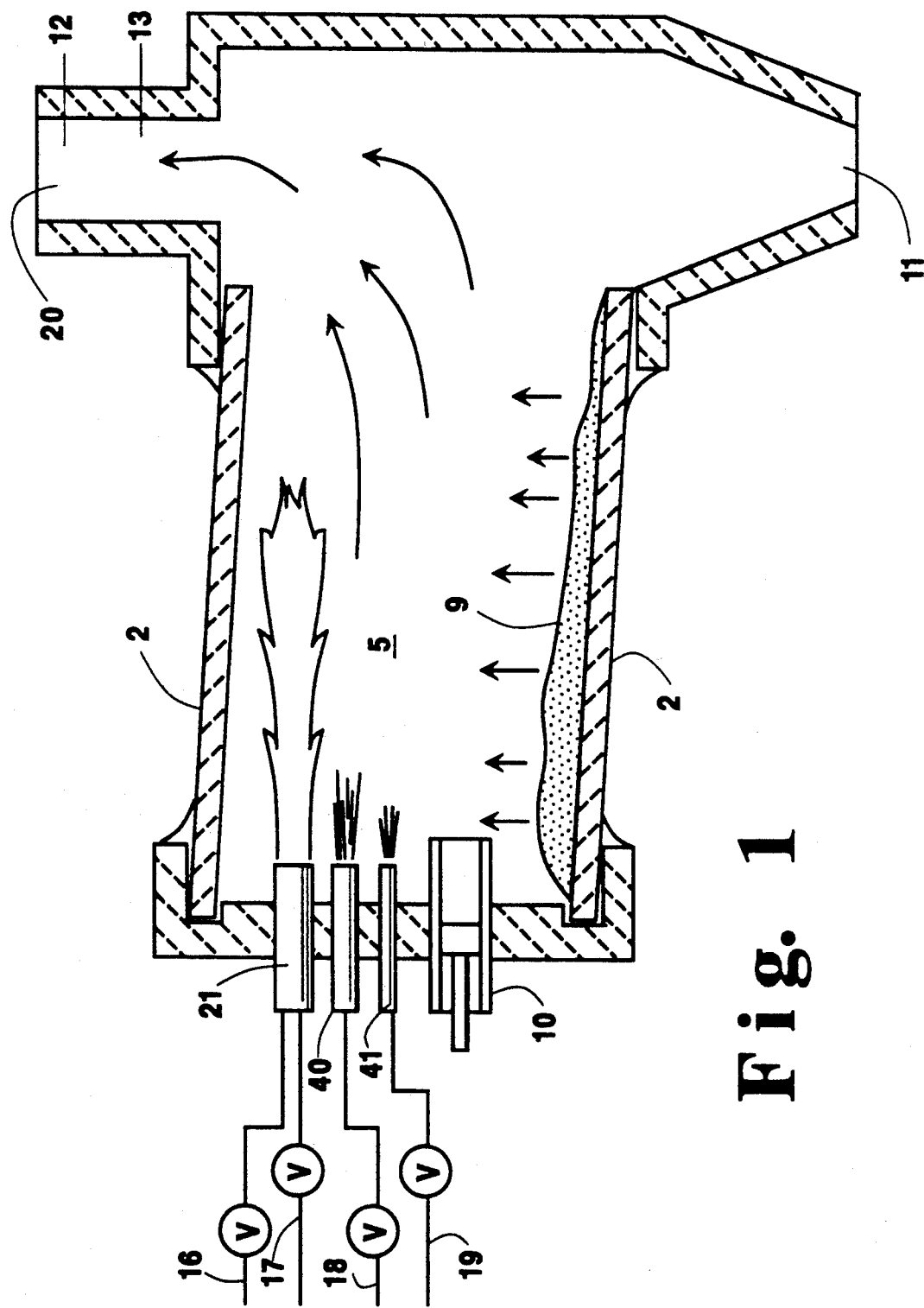
FIG. 1 is a simplified cross sectional representation of a single stage incinerator with which the invention may be practiced.

The invention will be described in detail with reference to the Drawings. Referring now to FIG. 1, incineration or combustion zone 5 is contained within furnace or incinerator 2 which may be, for example, a rotary kiln. In a two stage incineration system, such as that illustrated in FIG. 3, the incinerator may be the primary combustion chamber or the secondary combustion chamber or, if desired, the method of this invention may be practiced in both chambers. Main fuel is provided into incineration zone 5 through burner 21. Main fuel may also be provided into the incineration zone through a lance. The main fuel may be any controllable fuel and may be provided into the incineration zone as one or more streams. When the main fuel is provided into the incinerator in multiple streams, one or more of the streams may be controlled to change the overall flowrate of the main fuel. The main fuel may comprise more than one species. The main fuel may be any fluid fuel such as, for example, natural gas, methane, propane, and liquid fuel such as fuel oil, waste solvent, waste oil and the like. As shown in FIG. 1, the main fuel is provided into incineration zone 5 at a flowrate controlled by valve 16 which will be sufficient to provide the requisite heat when combusted to adequately incinerate waste provided into the incinerator. This flowrate is greater than a set minimum flowrate. The flowrate of the main fuel will vary depending upon the type of fuel employed as well as upon the characteristics of the waste. However, generally the minimum main fuel flowrate will be such as to provide at least five percent of the heat released to the incinerator when the main fuel is combusted in order to provide a stable combustion. However, the minimum main fuel flowrate may be zero in some cases.

Combustible waste 9 is provided into incinerator 2 such as through ram feeder 10. The combustible waste may be any material which will combust under the conditions within the incinerator. Examples of combustible waste which may be employed in carrying out the method of this invention include coal, wood, lignite, heavy oil, trash, solid and/or liquid waste, aqueous plant effluent and hazardous waste. When the incinerator is the secondary combustion chamber of a two stage system, the combustible waste may be effluent from the primary combustion chamber. Typically, when the combustible waste is in solid or liquid form, gaseous combustibles will volatize from the solid or liquid in the incinerator as indicated by the arrows.

Oxygen is provided into the incinerator to combust with the main fuel and with the combustible waste. Some oxygen is provided into the incinerator by air infiltration into the incinerator. The major oxygen, however, is provided into the incinerator through a lance such as lance 40 and/or through a burner such as burner 21 at a flowrate controlled by valve 18 and/or valve 17. This oxygen may be provided in the form of air, oxygen-enriched air or technically pure oxygen. Preferably, this oxygen is provided as one or more fluid streams having an oxygen concentration of at least 25 percent oxygen and most preferably as one stream having an oxygen concentration of a least 90 percent. This major oxygen is provided into the combustion zone at a flowrate sufficient to maintain the concentration of oxygen in the exhaust from the incinerator at or above a desired level, i.e. to satisfy an oxygen demand anticipated from the known main fuel flowrate and the expected fuel value of the combustible waste, or in the case where the incinerator is being operated in a paralytic mode, at a flowrate sufficient to maintain the concentration of combustibles in the exhaust at or below a desired level.

The oxygen provided into the incinerator combusts with the main fuel and the combustible waste to produce combustion reaction products which with other furnace gases pass through the incinerator and out of the incinerator through exhaust port or flue 20. The exhaust from the incinerator is monitored by monitors 12 and 13 to determine the concentration of oxygen or combustibles in the exhaust and to determine the temperature of the exhaust. For example, when the incinerator is operated in a non-paralytic or oxidative mode, it is desirable that the oxygen concentration in the exhaust not drop below about 2 percent thus ensuring complete combustion of the combustible material provided into the combustion zone. Ash, essentially devoid of volatizable combustibles, passes out of the incinerator through ash door 11.

Monitors 12 and 13 are connected to a feedback controller (not shown) which adjusts the flowrate of main fuel and oxidant into the incinerator by adjusting valves 16 and 17 and/or 18.

The temperature control can be done with the following algorithm. The temperature signal is passed to a temperature controller which compares this value with a desired value (the setpoint) and determines the desired heat release rate via an algorithm such as the conventional proportional-integral-derivative (PID) control. The computer or processor meanwhile can read the oxygen or combustible concentration in the exhaust and the total oxygen feedrate from all oxidants, and determines the total oxygen required for combustion. Since the liquid fuel flowrate is also read by the computer, the computer can calculate the oxygen requirement for combusting the liquid fuel. The difference between the total oxygen combustion requirement and the oxygen required for combusting the liquid fuel is then used to estimate the heat release (BTU) rate of the waste feed. The computer then compares the desired heat release and the waste heat release to determine the liquid fuel requirement by difference, or to be the minimum firing rate, whichever is higher. The total oxygen flow requirement is determined by a control algorithm (such as a PID algorithm) that compares the oxygen concentration value against the desired value (set point), plus the oxygen demand for waste combusting and oxygen demand for liquid fuel.

FIG. 3 illustrates a two-stage incinerator wherein the first stage is essentially identical to the incinerator illustrated in FIG. 1 and is so numbered and wherein the secondary stage is in flow communication with the first stage, having elements which correspond to the elements of the incinerator illustrated in FIG. 1 and numbered corresponding to the FIG. 1 numerals Plus ten for the common elements. With the FIG. 3 incinerator system, the invention may be practiced in either the primary or secondary chambers or in both. Since the operation of the FIG. 3 system with respect to the invention is similar to the operation of the FIG. 1 system, a detailed description of its operation will not be repeated. In FIG. 3, item 24 is a flue gas volume or velocity meter.

Figure 2:
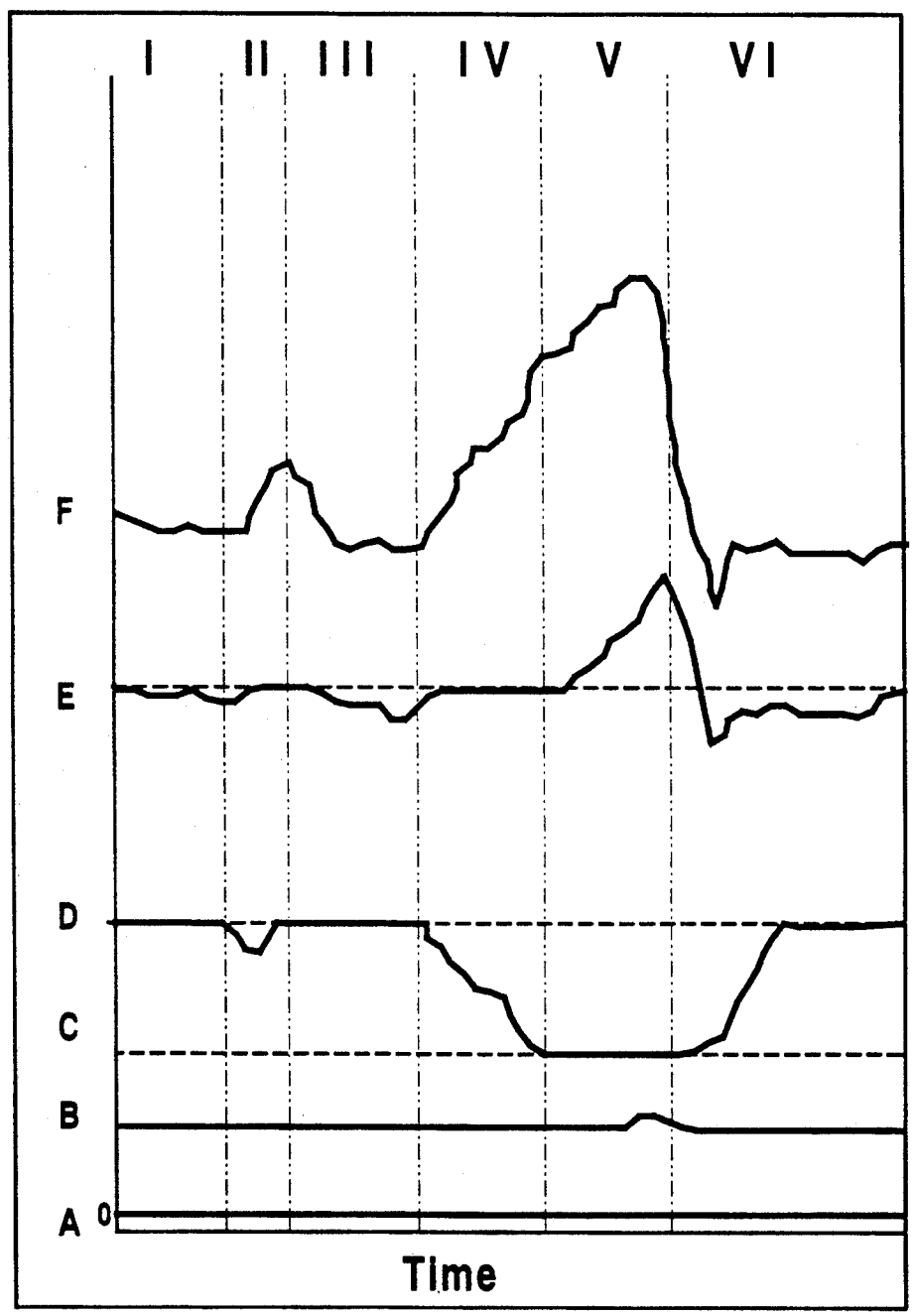
FIG. 2 is a time chart showing the changes of various parameters over time in the practice of this invention.

FIG. 2 is a time chart showing the changes of various incinerator inputs and conditions over time as they appear in different operating situations reflecting actual results in the operation of an incinerator using the method of this invention. Line A depicts the PICs monitored in the exhaust gas, Line B depicts the temperature of the exhaust gas, Line C is the minimum main fuel flowrate, Line D is the actual main fuel flowrate, Line E is the total oxygen flow into the incinerator from both infiltrating air and major oxygen injection, and Line F is the level of combustibles in the incinerator generated from the combustible waste. In Period I there is depicted the situation wherein the incinerator is operating at a relatively steady state with complete combustion of the combustibles within the combustion zone. In Period II there is depicted an increase in the level of combustible in the incinerator generated from the combustible waste. This situation could occur for several reasons such as the charging of a large amount of waste into the incinerator or the charging of waste having a large volatizable component. This increase in the level of combustibles within the incinerator causes an increase in the oxygen demand so as to avoid the generation of PICs. The increase in oxygen demand causes a reduction in the oxygen concentration in the exhaust to below the desired concentration. Conventional systems would respond to this situation by increasing the oxygen flow into the incinerator. In contrast to conventional procedures, in the practice of the method of this invention, the oxygen flow into the incinerator is not increased upon an increase in the oxygen demand, or is increased only marginally and not in proportion to the increase in the oxygen demand, but, rather, the flowrate of main fuel into the incinerator is decreased. The decrease continues until the level of combustibles within the incinerator stops increasing and the main fuel flowrate remains below the initial main fuel flowrate until the oxygen concentration in the exhaust is returned to the desired concentration and steady state operation is carried out as depicted in Period III. Thus, in this practice of the invention, PICs generation is controlled but without experiencing a temperature increase which would result if oxygen were proportionately added at the start of the period of increased oxygen demand.

In Period IV, there is again depicted an increase in the level of combustibles in the incinerator generated from the combustible waste. Again, there is shown a decrease in the main fuel flowrate in response to this situation while the oxygen flow into the incinerator is not increased, or not proportionally increased, as in the previously described practice of the invention. However, in the situation depicted in Period IV, the main fuel flowrate is reduced until it reaches the minimum main fuel flowrate. At this point the main fuel flowrate is not decreased further because such a decrease may result in too low of a furnace front end temperature or unstable combustion increasing the proclivity of generating PICs. Instead, as depicted in Period V, when the main fuel flowrate has been reduced to the minimum main fuel flowrate, the flow of oxygen into the incinerator is increased until the oxygen concentration in the exhaust is returned to the desired concentration and steady state operation is carried out as depicted in Period VI. Although there is a small rise in temperature due to the increase of oxygen flow into the incinerator, this is a relatively low rise due to the low level of main fuel provided into the furnace and does not threaten damage to the equipment. The temperature rise subsides with the reduction of the level of combustibles in the incinerator and the entire incineration process is carried out with PICs generation controlled.

An important aspect in the preferred practice of this invention is that when the level of combustibles generated by the waste decreases, the main fuel flowrate will be increased so that the total heat release to the incinerator remains steady. Thus the temperature does not drop significantly or undershoot after the upset event is over, so as to ensure high destruction efficiency of waste.

In some situations it may be desirable to operate the incinerator under paralytic conditions. One such situation is when the incinerator is the primary combustion chamber of a two stage incineration system. In this situation, the concentration of combustibles rather than the concentration of oxygen in the exhaust is controlled and its increase beyond a desired concentration serves as the trigger for reducing the flowrate of main fuel into the incinerator and vice versa. As in the case of oxidative operation, the key point is not increasing, or disproportionately increasing, the oxygen flowrate into the incinerator upon increased oxygen demand and responding by decreasing the main fuel flowrate into the furnace and increasing the oxygen flowrate if and when the main fuel flowrate has been decreased to the minimum main fuel flowrate.

The invention causes both the oxygen percent control and the temperature control to work together to select the correct control mechanism. When the oxygen demand increases above a ratio determined necessary to combust the fuel fed to the burner, the system correctly interprets that additional combustibles are being generated by the furnace. Rather than proportionately increasing oxygen flow, fuel flow to the burner is decreased by a calculated amount equal to the generated combustibles from the furnace. This estimation can be done by first calculating the total oxygen demand by the waste materials via a mass balance calculation and then converting the oxygen demand to a heating or BTU value using a known factor for the combustible material being combusted. Such an estimation is adequate for most combustible materials. If assumptions about the BTU value of the generated combustibles are reasonably correct, the amount of heat released will remain fairly constant. The main fuel flow to the furnace will only be allowed to be reduced to a minimum level that will still maintain stable combustion. Beyond that level any additional demand for oxygen is met by increasing oxygen flow. This would then cause the furnace temperature to start to rise but at a much later time than would otherwise be the case and only during very large combustible releases.

In its broadest embodiment, the invention comprises the reduction of main fuel flow into an incinerator when confronted with increased oxygen demand while refraining from a proportional increase in oxygen flow into the incinerator. If main fuel flow is reduced to the minimum, oxygen flow is increased; if the main fuel flow is not reduced to the minimum, the invention is practiced without any oxygen flow increase or only a small oxygen flow increase which is less than the increase in the oxygen demand.

Other additional temperature control methods can also be employed in the practice of this invention. For example, air flow into the incinerator may be increased to replace oxygen flow as long as the total gas flow does not exceed the allowable maximum. Water sprays may also be used for temperature control such as through water lance 41 controlled through valve 19.

By the practice of this invention one can operate an incinerator with oxygen-firing which can respond to system upsets involving increased oxygen demand without generating excessive PICs and without experiencing a deleterious temperature rise. By following the defined nonconventional sequence of steps of the method of this invention, one not only achieves the above-described advantageous results, but also one avoids a large increase in the gas volumetric flowrate which would reduce combustion zone residence time increasing PICs formation, and would overburden downstream gas handling systems.

Although the invention has been described in detail with reference to certain embodiments, those skilled in the art will recognize that there are other embodiments of the invention within the spirit and the scope of the claims.

We claim:

1. A method for operating an incinerator for the simultaneous control of temperature and products of incomplete combustion comprising:
    (A) providing a main flow of fuel into the incinerator at a flowrate greater than a minimum main fuel flowrate;
    (B) providing combustible waste into the incinerator;
    (C) providing oxygen into the incinerator at a flowrate sufficient to maintain a desired concentration of oxygen in the exhaust from the incinerator, and carrying out combustion within the incinerator;
    (D) monitoring the exhaust from the incinerator and, upon an increase in the oxygen demand in the incinerator, reducing the flowrate of main fuel into the incinerator to maintain the oxygen concentration in the exhaust at the desired concentration and maintain the total heat release rate from the combustion steady, or until the main fuel flowrate has been reduced to the minimum main fuel flowrate; and
    (E) upon reduction of the main fuel flowrate to the minimum main fuel flowrate, increasing the oxygen flowrate into the incinerator to return the oxygen concentration in the exhaust to the desired concentration.

2. The method of claim 1 wherein the desired concentration of oxygen in the exhaust is at least 2 percent.

3. The method of claim 1 wherein there is no increase in the oxygen flowrate into the incinerator during step (D).

4. A method for operating an incinerator for the simultaneous control of temperature and products of incomplete combustion comprising:
   (A) providing a main flow of fuel into the incinerator at a flowrate greater than a minimum main fuel flowrate;
   (B) providing combustible waste into the incinerator;
   (C) providing oxygen into the incinerator at a flowrate sufficient to maintain a desired concentration of combustibles in the exhaust from the incinerator, and carrying out combustion within the incinerator;
   (D) monitoring the exhaust from the incinerator and, upon an increase in the combustibles concentration in the exhaust above the desired concentration, reducing the flowrate of main fuel into the incinerator to return the combustibles concentration in the exhaust to the desired concentration and maintain the total heat release from the combustion steady, or until the main fuel flowrate has been reduced to the minimum main fuel flowrate; and
   (E) upon reduction of the main fuel flowrate to the minimum main fuel flowrate, increasing the oxygen flowrate into the incinerator to return the combustibles concentration in the exhaust to the desired concentration.

5. The method of claim 4 wherein there is no increase in the oxygen flowrate into the incinerator during step (D).

* * * * *

UNITED STATES PATENT AND TRADEMARK OFFICE
CERTIFICATE OF CORRECTION

PATENT NO. : 5,176,086
DATED : January 5, 1993
INVENTOR(S) : S. D. Clark, et al.

It is certified that error appears in the above-identified patent and that said Letters Patent is hereby corrected as shown below:

In column 6, line 14 delete "Plus" and insert therefor --plus--.

In column 7, line 35 delete "paralytic" and insert therefor --pyrolytic--.

Signed and Sealed this

Second Day of November, 1993

Attest:

BRUCE LEHMAN

Attesting Officer  Commissioner of Patents and Trademarks